US009176315B2

(12) United States Patent
Joo (10) Patent No.: US 9,176,315 B2
(45) Date of Patent: Nov. 3, 2015

(54) METHOD FOR CONTROLLING OPTICAL TRANSMISSIONS, DEVICE FOR CONTROLLING OPTICAL TRANSMISSIONS, AND METHOD FOR MANUFACTURING SAME

(71) Applicant: Jae Hyun Joo, Suwon-si (KR)

(72) Inventor: Jae Hyun Joo, Suwon-si (KR)

(73) Assignee: NANOBRICK CO., LTD., Suwon (KR)

( * ) Notice: Subject to any disclaimer, the term of this patent is extended or adjusted under 35 U.S.C. 154(b) by 0 days.

(21) Appl. No.: 14/373,364

(22) PCT Filed: Jan. 11, 2013

(86) PCT No.: PCT/KR2013/000237
§ 371 (c)(1),
(2) Date: Jul. 20, 2014

(87) PCT Pub. No.: WO2013/109020
PCT Pub. Date: Jul. 25, 2013

(65) Prior Publication Data
US 2015/0085334 A1    Mar. 26, 2015

(30) Foreign Application Priority Data

Jan. 20, 2012 (KR) .................. 10-2012-0006995
Jan. 20, 2012 (KR) .................. 10-2012-0006996
Oct. 26, 2012 (KR) .................. 10-2012-0120016

(51) Int. Cl.
G02B 26/02     (2006.01)
G02B 26/00     (2006.01)
G02B 5/20      (2006.01)

(52) U.S. Cl.
CPC .............. *G02B 26/005* (2013.01); *G02B 5/201* (2013.01); *G02B 26/004* (2013.01); *G02B 26/02* (2013.01)

(58) Field of Classification Search
CPC .... G02B 26/004; G02B 26/005; G02B 26/02; G02B 5/201
USPC .................................... 359/227–228
See application file for complete search history.

(56) References Cited

U.S. PATENT DOCUMENTS 5,296,974 A * 3/1994 Tada et al. ............... 359/885

FOREIGN PATENT DOCUMENTS

| JP | 2000-356750 A | 12/2000 |
|----|---------------|---------|
| JP | 2001-228307 A | 8/2001 |
| JP | 2006-500614 A | 1/2006 |
| KR | 10-2008-0111658 A | 12/2008 |
| KR | 101143489 B1 * | 5/2012 |
| WO | 2006-068128 A1 | 6/2006 |

OTHER PUBLICATIONS

International Search Report for International Application No. PCT/KR2013/005065, Korean Intellectual Property Office, May 9, 2013.

* cited by examiner

*Primary Examiner* — James Phan

(57) ABSTRACT

According to the method for controlling optical transmissions according to the present invention, in a state where particles formed of a light-blocking material, a first solvent with electro-wetting properties in which the particles are dispersed, and a second solvent which is not mixed with the first solvent are present in a space covered by an optical incident surface, the particles are mixed with the first solvent but not mixed with the second solvent, and an electric field applied to the first solvent is controlled so as to control the blocking area of the first solvent with respect to the optical incident surface and control optical transmittance.

20 Claims, 8 Drawing Sheets

METHOD FOR CONTROLLING OPTICAL TRANSMISSIONS, DEVICE FOR CONTROLLING OPTICAL TRANSMISSIONS, AND METHOD FOR MANUFACTURING SAME

PRIORITY

The present application claims priority under 35 U.S.C. §371 to PCT Application PCT/KR2013/000237, filed on Jan. 11, 2013, which claims priority to Korean Patent Application No. 10-2012-0006995, filed on Jan. 20, 2012, to Korean Patent Application No. 10-2012-0006996, filed on Jan. 20, 2012, and to Korean Patent Application No. 10-2012-0120016, filed on Oct. 26, 2012, the disclosures of which are hereby incorporated by reference in their entireties.

FIELD OF THE INVENTION

The present invention relates to a method for adjusting light transmission, a device for adjusting light transmission, and a method for manufacturing the same. More particularly, the present invention relates to a method for adjusting light transmittance by controlling a blocking area of a solvent, in which particles composed of a light blocking material are dispersed, with respect to a light incident surface, as well as a device for adjusting light transmittance and a method for manufacturing the same.

BACKGROUND

A variety of conventional techniques for adjusting light transmittance have been introduced.

First, one example thereof is a technique for adjusting light transmittance using polymer dispersed liquid crystal (PDLC). The polymer dispersed liquid crystal controls transmission of light according to a scattering intensity of the light. When no voltage (i.e., electric field) is applied thereto, the direction of molecules of the liquid crystal becomes irregular to generate scattering on an interface having a refractive index different from that of the medium, so that the light transmittance is decreased. When a voltage is applied thereto, the direction of the liquid crystal becomes regular to make the refractive indices the same at the interface, so that the light transmittance is increased. However, according to the above conventional technique, there occurs a problem that when attempting to realize a transparent state by applying a voltage, it is difficult to achieve high light transmittance close to 100% due to the light scattering caused by the liquid crystal. There also occurs a problem that when the thickness of cells is not great, contrast cannot be ensured, consequently increasing a driving voltage.

Next, another example is a technique of adjusting light transmittance using a suspended particle device (SPD). According to this technique, light transmittance is adjusted by applying an electric field to control the arrangement of particles dispersed in a liquid. However, according to the above conventional technique, there occurs a problem that it is difficult to achieve high light transmittance close to 100% due to the particles extensively dispersed in the liquid.

Next, yet another example is a technique of adjusting light transmittance using an electrowetting display (EWD). According to this technique, light transmittance may be controlled by applying an electric field to a first liquid including a light blocking agent (e.g., a dye or the like) and a second liquid not being mixed with the first liquid to control the wettability between the first liquid and a substrate. However, according to the above conventional technique using the electrowetting display, light is blocked using a dye dispersed in a liquid and it is difficult to reliably block the light only with the dye, which causes a problem that increase in the degree of the light blocking is limited and an optical density (OD) is also low. Further, there occurs a durability problem, for example, that the dye is degenerated by infrared light or the state of a substrate surface is repeatedly changed (e.g., from hydrophilic to hydrophobic or vice versa) so that the reproducibility of the surface state is reduced.

Next, still another example is a technique of adjusting light transmittance using an electrophoretic display (EPD). According to this technique, light transmittance may be adjusted by applying an electric field to charged particles to move the particles and adjusting the degree of light blocking by means of the moved particles. However, according to the above conventional technique, the moving speed of the particles is not sufficiently high due to the movement resistance of the particles in a solvent, which causes a problem that the operation of adjusting the light transmittance becomes slower.

In this regard, the inventors of the present invention have conceived a method for adjusting light transmission, which may accelerate the switching of light transmittance, increase an optical density, and achieve high light transmittance close to 100%, as well as a device for adjusting light transmission and a method for manufacturing the same.

SUMMARY OF THE INVENTION

One object of the present invention is to solve all the above-mentioned problems.

Another object of the invention is to provide a method for adjusting light transmission, a device for adjusting light transmission, and a method for manufacturing the same, wherein while a first solvent in which particles composed of a light blocking material are dispersed and a second solvent not being mixed with the first solvent are put together into a space covered by a light incident surface, light transmittance is adjusted by adjusting an electric field applied to the particles or the first solvent to control a blocking area of the first solvent with respect to the light incident surface.

A method for adjusting light transmission according to the invention is characterized in that while particles composed of a light blocking material, a first solvent having an electrowetting property in which the particles are dispersed, and a second solvent not being mixed with the first solvent, the particles being mixed with the first solvent but not being mixed with the second solvent, exist in a space covered by a light incident surface, light transmittance is adjusted by adjusting an electric field applied to the first solvent to control a blocking area of the first solvent with respect to the light incident surface.

Further, a method for adjusting light transmission according to the invention is characterized in that while charged particles composed of a light blocking material, a first solvent in which the particles are dispersed, and a second solvent not being mixed with the first solvent, the particles being mixed with the first solvent but not being mixed with the second solvent, exist in a space covered by a light incident surface, light transmittance is adjusted by adjusting an electric field applied to the particles to move the particles and moving the first solvent together with the particles using a difference in movement resistance at an interface between the particles and the first solvent and that at an interface between the first solvent and the second solvent to control a blocking area of the first solvent with respect to the light incident surface.

In addition, a method for adjusting light transmission according to the invention is characterized in that while charged particles composed of a light blocking material, a first solvent having an electrowetting property in which the particles are dispersed, and a second solvent not being mixed with the first solvent, the particles being mixed with the first solvent but not being mixed with the second solvent, exist in a space covered by a light incident surface, light transmittance is adjusted by adjusting an electric field applied to the first solvent to control a blocking area of the first solvent with respect to the light incident surface, and by adjusting an electric field applied to the particles to move the particles and moving the first solvent together with the particles using a difference in movement resistance at an interface between the particles and the first solvent and that at an interface between the first solvent and the second solvent to control a blocking area of the first solvent with respect to the light incident surface.

Further, a method for adjusting light transmission according to the invention is characterized in that while particles composed of a light blocking material, a first solvent in which the particles are dispersed, and a second solvent having an electrowetting property and not being mixed with the first solvent, the particles being mixed with the first solvent but not being mixed with the second solvent, exist in a space covered by a light incident surface, light transmittance is adjusted by adjusting an electric field applied to the second solvent to control a blocking area of the second solvent with respect to the light incident surface, thereby indirectly controlling a blocking area of the first solvent with respect to the light incident surface.

At least one of the first solvent and the second solvent may be composed of a light transmitting material.

The particles and the first solvent may be polar and the second solvent may be non-polar, or the particles and the first solvent may be non-polar and the second solvent may be polar.

The particles, the first solvent and the second solvent may be encapsulated by capsules composed of a light transmitting material or partitioned by cells composed of an insulating material.

After the electric field is applied to the particles, the first solvent and the second solvent, an electric field in the opposite direction of the electric field or an alternating-current electric field may be applied to reset an arrangement of the particles, the first solvent and the second solvent.

The light transmittance may be adjusted by adjusting at least one of an intensity, direction, application time, number of times of application, and application period of the electric field.

When the electric field is not applied, an electric field generated by a capacitor storing charges and applied to the first solvent may be adjusted to determine a blocking area of the first solvent with respect to the light incident surface.

The light transmitting material may include at least one of an ultraviolet light transmitting material, a visible light transmitting material, and an infrared light transmitting material.

Further, a device for adjusting light transmission according to the invention comprises particles composed of a light blocking material, a first solvent having an electrowetting property in which the particles are dispersed, and a second solvent not being mixed with the first solvent, wherein the particles are mixed with the first solvent but are not mixed with the second solvent, and wherein light transmittance is adjusted by adjusting an electric field applied to the first solvent to control a blocking area of the first solvent with respect to a light incident surface.

Further, a device for adjusting light transmission according to the invention comprises particles composed of a light blocking material, a first solvent in which the particles are dispersed, and a second solvent not being mixed with the first solvent, wherein the particles are mixed with the first solvent but are not mixed with the second solvent, and wherein light transmittance is adjusted by adjusting an electric field applied to the particles to move the particles and moving the first solvent together with the particles using a difference in movement resistance at an interface between the particles and the first solvent and that at an interface between the first solvent and the second solvent to control a blocking area of the first solvent with respect to a light incident surface.

Further, a device for adjusting light transmission according to the invention comprises charged particles composed a light blocking material, a first solvent having an electrowetting property in which the particles are dispersed, and a second solvent not being mixed with the first solvent, wherein the particles are mixed with the first solvent but are not mixed with the second solvent, and wherein light transmittance is adjusted by adjusting an electric field applied to the first solvent to control a blocking area of the first solvent with respect to a light incident surface, and by adjusting an electric field applied to the particles to move the particles and moving the first solvent together with the particles using a difference in movement resistance at an interface between the particles and the first solvent and that at an interface between the first solvent and the second solvent to control a blocking area of the first solvent with respect to the light incident surface.

Further, a device for adjusting light transmission according to the invention comprises particles composed of a light blocking material, a first solvent in which the particles are dispersed, and a second solvent having an electrowetting property and not being mixed with the first solvent, wherein the particles are mixed with the first solvent but are not mixed with the second solvent, and wherein light transmittance is adjusted by adjusting an electric field applied to the second solvent to control a blocking area of the second solvent with respect to a light incident surface, thereby indirectly controlling a blocking area of the first solvent with respect to the light incident surface.

At least one of the first solvent and the second solvent may be composed of a light transmitting material.

The particles and the first solvent may be polar and the second solvent may be non-polar, or the particles and the first solvent may be non-polar and the second solvent may be polar.

Movement resistance at an interface between the particles and the first solvent may be larger than that at an interface between the first solvent and the second solvent.

The particles, the first solvent and the second solvent may be encapsulated by capsules composed of a light transmitting material or partitioned by cells composed of an insulating material.

After the electric field is applied to the particles, the first solvent and the second solvent, an electric field in the opposite direction of the electric field or an alternating-current electric field may be applied to reset an arrangement of the particles, the first solvent and the second solvent.

The light transmittance may be adjusted by adjusting at least one of an intensity, direction, application time, number of times of application, and application period of the electric field.

When the electric field is not applied, an electric field generated by a capacitor storing charges and applied to the first solvent may be adjusted to determine a blocking area of the first solvent with respect to the light incident surface.

The light transmitting material may include at least one of an ultraviolet light transmitting material, a visible light transmitting material, and an infrared light transmitting material.

Further, a method for adjusting light transmission according to the invention is characterized in that while particles composed of a light blocking material and a first solvent having an electrowetting property in which the particles are dispersed exist in a space covered by a light incident surface, light transmittance is adjusted by adjusting an electric field applied to the first solvent to control a blocking area of the first solvent with respect to the light incident surface.

Further, a method for adjusting light transmission according to the invention is characterized in that while charged particles composed of a light blocking material and a first solvent in which the particles are dispersed exist in a space covered by a light incident surface, light transmittance is adjusted by adjusting an electric field applied to the particles to move the particles and moving the first solvent together with the particles using movement resistance at an interface between the particles and the first solvent to control a blocking area of the first solvent with respect to the light incident surface.

Further, a method for adjusting light transmission according to the invention is characterized in that while charged particles composed of a light blocking material and a first solvent having an electrowetting property in which the particles are dispersed exist in a space covered by a light incident surface, light transmittance is adjusted by adjusting an electric field applied to the first solvent to control a blocking area of the first solvent with respect to the light incident surface, and by adjusting an electric field applied to the particles to move the particles and moving the first solvent together with the particles using movement resistance at an interface between the particles and the first solvent to control a blocking area of the first solvent with respect to the light incident surface.

Further, a device for adjusting light transmission according to the invention comprises particles composed of a light blocking material, and a first solvent having an electrowetting property in which the particles are dispersed, wherein light transmittance is adjusted by adjusting an electric field applied to the first solvent to control a blocking area of the first solvent with respect to a light incident surface.

Further, a device for adjusting light transmission according to the invention comprises charged particles composed of a light blocking material, and a first solvent in which the particles are dispersed, wherein light transmittance is adjusted by adjusting an electric field applied to the particles to move the particles and moving the first solvent together with the particles using movement resistance at an interface between the particles and the first solvent to control a blocking area of the first solvent with respect to a light incident surface.

Further, a device for adjusting light transmission according to the invention comprises charged particles composed of a light blocking material, and a first solvent having an electrowetting property in which the particles are dispersed, wherein light transmittance is adjusted by adjusting an electric field applied to the first solvent to control a blocking area of the first solvent with respect to a light incident surface, and by adjusting an electric field applied to the particles to move the particles and moving the first solvent together with the particles using movement resistance at an interface between the particles and the first solvent to control a blocking area of the first solvent with respect to the light incident surface.

Further, a method for manufacturing a device for adjusting light transmission according to the invention comprises the steps of forming an emulsion by mixing the first solvent in which the particles are dispersed and the second solvent, and injecting the emulsion into cells, the emulsion injected into the cells being separated into the first solvent and the second solvent over time.

Further, a method for manufacturing a device for adjusting light transmission according to the invention comprises the steps of injecting the first solvent in which the particles are dispersed into cells so that the first solvent is disposed only in a partial region within the cells, the cells being formed by dividing a substrate using at least one partition, and injecting the second solvent into the cells in which the first solvent is injected.

According to the above configurations, the present invention may have only the advantages of the conventional techniques of adjusting light transmittance using an electrophoretic display (EPD) and using an electrowetting display (EWD), thereby accelerating the switching of light transmittance, increasing an optical density (OD), and achieving high light transmittance close to 100%.

DETAILED DESCRIPTION OF THE PREFERRED EMBODIMENTS

In the following detailed description of the present invention, references are made to the accompanying drawings that show, by way of illustration, specific embodiments in which the invention may be practiced. These embodiments are described in sufficient detail to enable those skilled in the art to carry out the invention. It should be understood that the various embodiments of the invention, although different from each other, are not necessarily mutually exclusive. For example, specific shapes, structures, and characteristics described herein may be implemented as modified from one embodiment to another without departing from the spirit and scope of the invention. Moreover, it should be understood that the locations or arrangements of individual elements within each of the embodiments described herein may also be modified without departing from the spirit and scope of the invention. Accordingly, the following detailed description is not to be taken in a limiting sense, and the scope of the invention is to be taken as encompassing the scope of the appended claims and all equivalents thereof, as long as properly described. In the drawings, like reference numerals refer to the same or similar functions throughout the several views.

Hereinafter, preferred embodiments of the present invention will be described in detail with reference to the accompanying drawings to enable those skilled in the art to easily implement the invention.

Configuration of a Device for Adjusting Light Transmission

Figure 1:
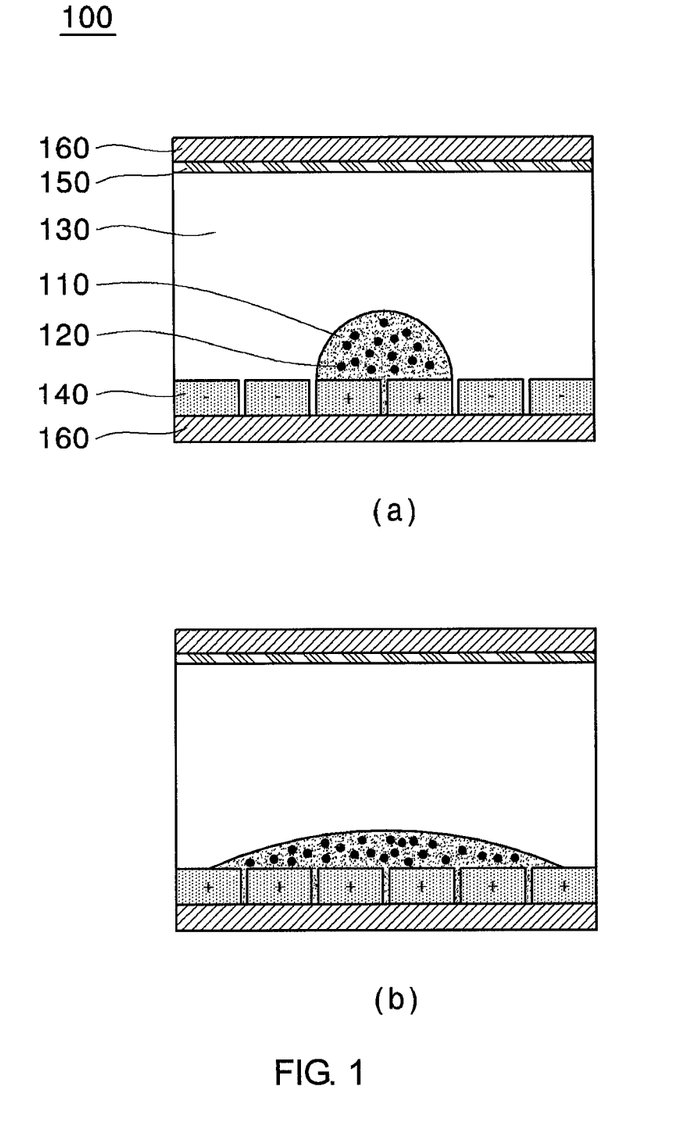
FIG. 1 shows the configuration and operation principle of a device for adjusting light transmission according to a first embodiment of the invention.

FIG. 1 illustratively shows the configuration and operation principle of a device for adjusting light transmission according to a first embodiment of the invention.

With reference to FIG. 1, a device 100 for adjusting light transmission according to the first embodiment of the invention may comprise a first solvent 110, particles 120, a second solvent 130, a lower electrode 140, an upper electrode 150, and a substrate 160.

According to the first embodiment of the invention, the first solvent 110 may be composed of a material having an electrowetting property. Thus, when an electric field is applied to the first solvent 110 through the lower and upper electrodes, an electrowetting phenomenon may occur. Specifically, when an electric field is applied to the first solvent 110, a contact angle of the first solvent 110 with respect to the substrate 160 (i.e., a light incident surface) may be changed, and accordingly a contact area (i.e., blocking area) of the first solvent 110 with respect to the substrate 160 may be controlled.

Further, according to the first embodiment of the invention, the particles 120 may be composed of a material that may block light, and may have a unique color. For example, the particles 120 may include carbon (C), titanium oxide (TiOx), or the like. Further, according to the first embodiment of the invention, the particles 120 may be dispersed in the first solvent 110. In this case, if the contact area of the first solvent 110 with respect to the substrate 160 is increased, a distribution area of the particles 120 is increased to lower the transmittance of light incident on the substrate 160. If the contact area of the first solvent 110 with respect to the substrate 160 is reduced, the distribution area of the particles 120 is reduced to increase the transmittance of light incident on the substrate 160.

Further, according to the first embodiment of the invention, the second solvent 130 may be composed of a material having immiscibility with the first solvent 110 and the particles 120. For example, the second solvent 130 may be hydrophobic if the first solvent 110 and the particles 120 are hydrophilic, and may be hydrophilic if the first solvent 110 and the particles 120 are hydrophobic. For another example, the second solvent 130 may be non-polar if the first solvent 110 and the particles 120 are polar, and may be polar if the first solvent 110 and the particles 120 are non-polar. Therefore, the particles 120 may remain mixed with the first solvent 110 but not mixed with the second solvent 130.

With reference to (a) of FIG. 1, the device 100 for adjusting light transmission according to the first embodiment of the invention may apply a positive (+) voltage to some of a plurality of patterned partial electrodes constituting the lower electrode 140 and apply a negative (−) voltage to the remaining partial electrodes, thereby increasing a contact angle of the first solvent 110 having the electrowetting property with respect to the substrate 160 so that the first solvent 110 may be locally contacted only with the regions of the substrate 160 where the partial electrodes to which the positive voltage is applied are positioned. In this case, the area where the light blocking particles 120 are distributed is reduced so that the transmittance of light incident on the substrate 160 may be increased. On the contrary, with reference to (b) of FIG. 1, the device 100 for adjusting light transmission according to the first embodiment of the invention may apply a positive (+) voltage to all the partial electrodes constituting the lower electrode 140, thereby lowering a contact angle of the first solvent 110 having the electrowetting property with respect to the substrate 160 so that the first solvent 110 may be contacted with most of the regions of the substrate 160 where the partial electrodes to which the positive voltage is applied are positioned. In this case, the area where the light blocking particles 120 are distributed is increased so that the transmittance of light incident on the substrate 160 may be reduced.

Meanwhile, although FIG. 1 only illustrates the case where the first solvent 110 has the electro-wetting property, a device for adjusting light transmission according to the first embodiment of the invention is not necessarily limited to the configuration shown in FIG. 1. That is, according to the first embodiment of the invention, the second solvent 130 may be composed of a material having an electrowetting property. In this case, a voltage may be applied through the lower electrode 140 to control a contact area of the second solvent 130 with respect to the substrate 160, and also to indirectly (or relatively) control a contact area of the first solvent 110 not mixed with the second solvent 130 with respect to the substrate 160, so that the transmittance of light incident on the substrate 160 may be consequently controlled.

Since the above-described device 100 for adjusting light transmission according to the first embodiment of the invention employs the particles having a better light blocking property as compared to a conventional electrowetting display, an optical density may be increased and light blocking performance may be enhanced.

Figure 2:
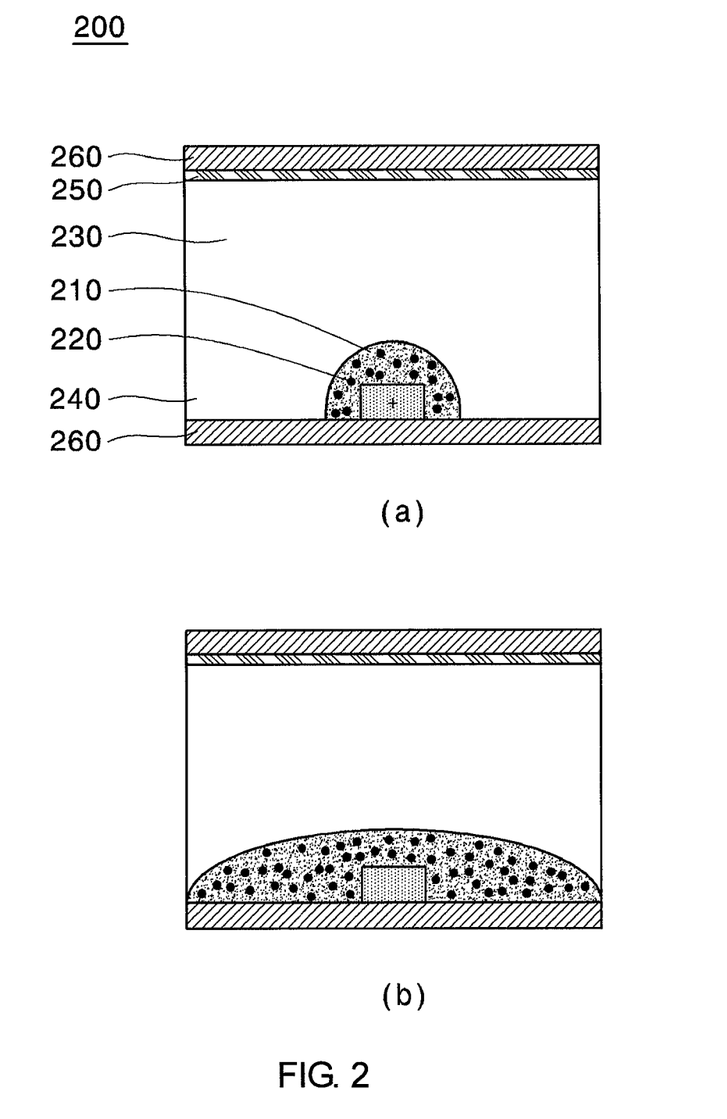
FIG. 2 shows the configuration and operation principle of a device for adjusting light transmission according to a second embodiment of the invention.

FIG. 2 illustratively shows the configuration and operation principle of a device for adjusting light transmission according to a second embodiment of the invention.

With reference to FIG. 2, a device 200 for adjusting light transmission according to the second embodiment of the invention may comprise a first solvent 210, particles 220, a second solvent 230, a lower electrode 240, an upper electrode 250, and a substrate 260.

According to the second embodiment of the invention, the first solvent 210 may be composed of a material having a small contact angle with respect to the substrate 260 (i.e., a material having high wettability with respect to the substrate 260). In this case, when no external force is applied to the first solvent 210, the first solvent 210 is widely distributed on the substrate 260 so that the contact area with respect to the substrate 260 may remain large. In contrast, according to the second embodiment of the invention, the first solvent 210 may be composed of a material having a large contact angle with respect to the substrate 260 (i.e., a material having low wettability with respect to the substrate 260). In this case, when no external force is applied to the first solvent 210, the first solvent 210 is narrowly distributed on the substrate 260 so that the contact area with respect to the substrate 260 may remain small.

Further, according to the second embodiment of the invention, the particles 220 may be composed of a material that may block light, and may have a unique color. For example, the particles 220 may include carbon (C), titanium oxide (TiOx), or the like. According to the second embodiment of the invention, the particles 220 may be dispersed in the first solvent 210. In this case, if the contact area of the first solvent 210 with respect to the substrate 260 is increased, a distribution area of the particles 220 is increased to lower the transmittance of light incident on the substrate 260. If the contact area of the first solvent 210 with respect to the substrate 260 is reduced, the distribution area of the particles 220 is reduced to increase the transmittance of light incident on the substrate 260.

Further, according to the second embodiment of the invention, the particles 220 may be charged, and thus an electrophoresis phenomenon may occur when an electric field is applied through the lower and upper electrodes 240 and 250. For example, it may be assumed that the particles 220 are negatively charged. In this case, when a positive voltage is applied through the lower electrode 240, the particles 220 may move toward the lower electrode 240.

Further, according to the second embodiment of the invention, the second solvent 230 may be composed of a material having immiscibility with the first solvent 210 and the particles 220. For example, the second solvent 230 may be hydrophobic if the first solvent 210 and the particles 220 are hydrophilic, and may be hydrophilic if the first solvent 210 and the particles 220 are hydrophobic. For another example, the second solvent 230 may be non-polar if the first solvent 210 and the particles 220 are polar, and may be polar if the first solvent 210 and the particles 220 are non-polar. Therefore, the particles 220 may remain mixed with the first solvent 210 but not mixed with the second solvent 230.

Further, according to the second embodiment of the invention, if the particles 220 dispersed in the first solvent 210 are moved in response to electric attraction caused by electrophoresis as an electric field is applied to the particles 220, some shear stress may be applied to an interface of the particles 220. If the movement resistance (which is a kind of frictional force) at the interface between the first solvent 210 and the particles 220 is larger than that at the interface between the first solvent 210 and the second solvent 230, moving along the interface between the first solvent 210 and the second solvent 230 is easier than moving along the interface between the first solvent 210 and the particles 220. Therefore, the particles 220 and the first solvent 210 may move together along the interface between the first solvent 210 and the second solvent 230, rather than the particles 220 moving alone along the interface between the particles 220 and the first solvent 210.

With reference to (a) of FIG. 2, the device 200 for adjusting light transmission according to the second embodiment of the invention may apply a positive (+) voltage to the lower electrode 240 to move the negatively charged particles 220 toward the lower electrode, so that the first solvent 210 moving together with the particles 220 is locally contacted only with the region of the substrate 260 where the lower electrode 240 is positioned. In this case, the area where the light blocking particles 220 are distributed is reduced so that the transmittance of light incident on the substrate 260 may be increased. On the contrary, with reference to (b) of FIG. 2, the device 200 for adjusting light transmission according to the second embodiment of the invention may not apply a voltage or may apply a negative (−) voltage to the lower electrode 240 so that the negatively charged particles 220 are not particularly concentrated toward the lower electrode. Further, the first solvent 210 and the particles 220 are widely distributed on the substrate 260 due to the wetting property of the first solvent 210 (i.e., the contact area with respect to the substrate 260 being basically large due to the small contact angle with respect to the substrate 260) in which the particles 220 are dispersed, so that the contact area with respect to the substrate 260 may be increased. In this case, the area where the light blocking particles 220 are distributed is increased so that transmittance of light incident on the substrate 260 may be reduced.

Meanwhile, FIG. 2 only illustrates the case where the first solvent 210 is characterized in that the contact area with respect to the substrate 260 is basically small due to its large contact angle with respect to the substrate 260, and the lower electrode 240 is formed only on a partial region of the substrate 260. However, a device for adjusting light transmission according to the second embodiment of the invention is not necessarily limited to the configuration shown in FIG. 2. That is, according to the second embodiment of the invention, it may be assumed that the first solvent 210 is characterized in that the contact area with respect to the substrate 260 is basically small due to its large contact angle with respect to the substrate 260, and the lower electrode 240 is formed on the entire regions of the substrate 260. In this case, when a voltage is applied to a large region of the substrate through the lower electrode 240, the particles 220 and the first solvent 210 are widely distributed on the substrate 260 due to the movement of the particles 220 caused by electrophoresis and the movement of the first solvent 210 caused by the difference in the movement resistance, so that the transmittance of light incident on the substrate 260 may be reduced. In contrast, when no voltage is applied through the lower electrode 240, the particles 220 and the first solvent 210 are narrowly distributed on the substrate 260 due to the wetting property of the first solvent 210 (i.e., its large contact angle with respect to the substrate 260), so that the transmittance of light incident on the substrate 260 may be increased.

Meanwhile, according to the second embodiment of the invention, the wetting properties of the first solvent 210 and the second solvent 230 with respect to the substrate may be similar when no electric field is applied (i.e., the difference between the contact angle of the first solvent 210 with respect to the substrate 260 and that of the second solvent 230 with respect to the substrate 260 is within a predetermined range when no electric field is applied), so that the relative movement of the first solvent 210 and the second solvent 230 may not occur when no external force acts thereon. In this case, even if a voltage is applied to move the particles 220 and the first solvent 210 and adjust light transmittance, and then the applied voltage is blocked, the relative movement of the first solvent 210 and the second solvent 230 may not occur. Therefore, the light transmittance that has been adjusted while the voltage is applied may remain the same even after the voltage is blocked.

Since the above-described device 200 for adjusting light transmission according to the second embodiment of the invention may reduce the movement resistance of the particles as compared to a conventional electrophoretic display, the moving speed of the particles may be increased and further the switching of light transmittance may be accelerated.

Figure 3:
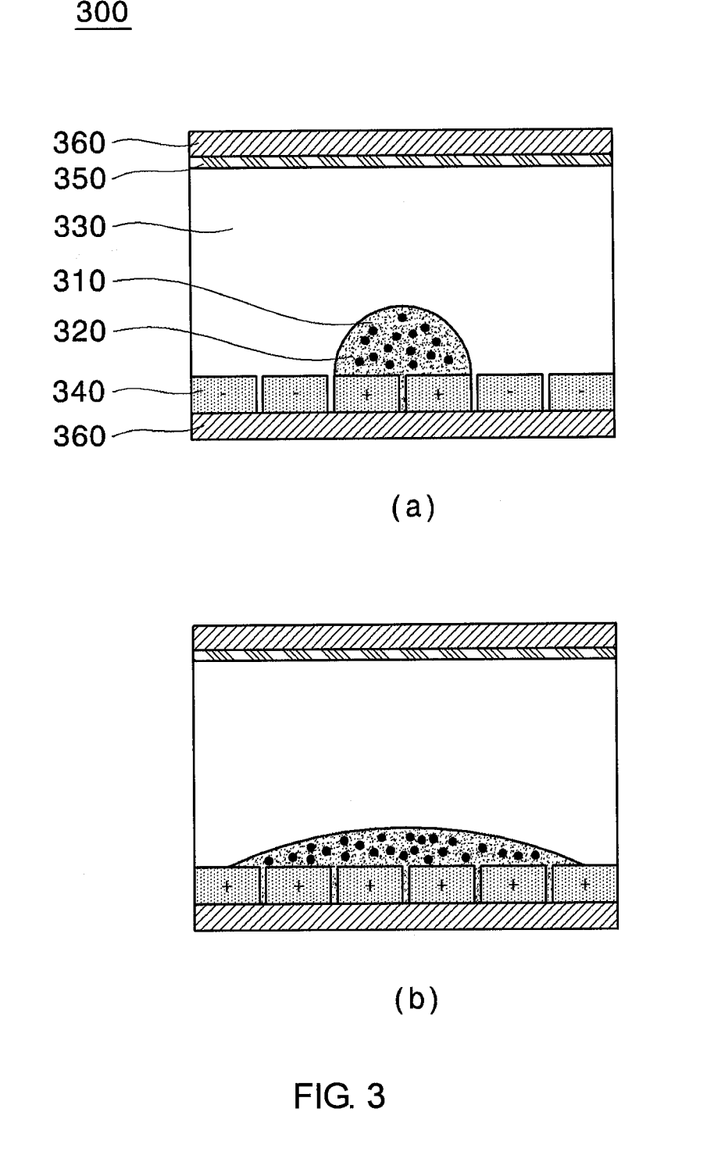
FIG. 3 shows the configuration and operation principle of a device for adjusting light transmission according to a third embodiment of the invention.

FIG. 3 illustratively shows the configuration and operation principle of a device for adjusting light transmission according to the third embodiment of the invention.

With reference to FIG. 3, a device 300 for adjusting light transmission according to the third embodiment of the invention may comprise a first solvent 310, particles 320, a second solvent 330, a lower electrode 340, an upper electrode 350, and a substrate 360. It should be noted that the device 300 for adjusting light transmission according to the third embodiment of the invention may be a combination of the device 100 for adjusting light transmission according to the first embodiment of the invention and the device 200 for adjusting light transmission according to the second embodiment of the invention.

According to the third embodiment of the invention, the first solvent 310 may be composed of a material having an electrowetting property. Thus, an electrowetting phenomenon may occur when an electric field is applied to the first solvent 310 through the lower and upper electrodes. Specifically, when an electric field is applied to the first solvent 310, a contact angle of the first solvent 310 with respect to the substrate 360 may be changed, and accordingly a contact area of the first solvent 310 with respect to the substrate 360 may be changed.

Further, according to the third embodiment of the invention, the particles 320 may be composed of a material that may block light, and may have a unique color. For example, the particles 320 may include carbon (C), titanium oxide (TiOx), or the like. Further, according to the third embodiment of the invention, the particles 320 may be dispersed in the first solvent 310. In this case, if the contact area of the first solvent 310 with respect to the substrate 360 is increased, a distribution area of the particles 320 is increased to lower the transmittance of light incident on the substrate 360. If the contact area of the first solvent 310 with respect to the substrate 360 is reduced, the distribution area of the particles 320 is reduced to increase the transmittance of light incident on the substrate 360. Further, according to the third embodiment of the invention, the particles 320 may be charged, and thus an electrophoresis phenomenon may occur when an electric field is applied through the lower and upper electrodes 340 and 350. For example, it may be assumed that the particles 320 are negatively charged. In this case, when a positive voltage is applied through the lower electrode 340, the particles 320 may move toward the lower electrode 340.

Further, according to the third embodiment of the present invention, the second solvent 330 may be composed of a material having immiscibility with the first solvent 310 and the particles 320. For example, the second solvent 330 may be hydrophobic if the first solvent 310 and the particles 320 are hydrophilic, and may be hydrophilic if the first solvent 310 and the particles 320 are hydrophobic. For another example, the second solvent 330 may be non-polar if the first solvent 310 and the particles 320 are polar, and may be polar if the first solvent 310 and the particles 320 are non-polar. Therefore, the particles 320 may remain mixed with the first solvent 310 but not mixed with the second solvent 330.

Further, according to the third embodiment of the invention, if the particles 320 dispersed in the first solvent 310 are moved in response to electric attraction caused by electrophoresis as an electric field is applied to the particles 320, some shear stress may be applied to an interface of the particles 320. If the movement resistance (which is a kind of frictional force) at the interface between the first solvent 310 and the particles 320 is larger than that at the interface between the first solvent 310 and the second solvent 330, moving along the interface between the first solvent 310 and the second solvent 330 is easier than moving along the interface between the first solvent 310 and the particles 320. Therefore, the particles 320 and the first solvent 210 may move together along the interface between the first solvent 310 and the second solvent 330, rather than the particles 320 moving alone along the interface between the particles 320 and the first solvent 310.

With reference to (a) of FIG. 3, the device 300 for adjusting light transmission according to the third embodiment of the invention may apply a positive (+) voltage to some of a plurality of patterned partial electrodes constituting the lower electrode 340 and apply a negative (−) voltage to the remaining partial electrodes, so that a contact angle of the first solvent 310 having the electrowetting property with respect to the substrate 360 may be increased while the particles 320 having the electrophoretic property may be moved together with the first solvent 310 toward the partial electrodes to which the positive voltage is applied. In this case, the first solvent 310 may be locally contacted only with the regions of the substrate 360 where the partial electrodes to which the positive voltage is applied are positioned. In this case, the area where the light blocking particles 320 are distributed is reduced so that the transmittance of light incident on the substrate 360 may be increased. In contrast, with reference to (b) of FIG. 3, the device 300 for adjusting light transmission according to the third embodiment of the invention may apply a positive (+) voltage to all of a plurality of patterned partial electrodes constituting the lower electrode 340, so that a contact angle of the first solvent 310 having the electrowetting property with respect to the substrate 360 may be reduced while the particles 320 having the electrophoretic property may be evenly distributed, together with the first solvent 310, with respect to all the partial electrodes to which the positive voltage is applied. In this case, the first solvent 310 may be contacted with most of the regions of the substrate 360 where the partial electrodes to which the positive voltage is applied are positioned, and accordingly the area where the light blocking particles 320 are distributed is increased so that the transmittance of light incident on the substrate 360 may be reduced.

Meanwhile, although FIG. 3 only illustrates the case where a voltage is applied through at least a part of the lower electrode 340, a device for adjusting light transmission according to the third embodiment of the invention is not necessarily limited to the configuration shown in FIG. 3. That is, according to the third embodiment of the present invention, it may be assumed that the first solvent 310 is characterized in that the contact area with respect to the substrate 360 is basically small due to its large contact angle with respect to the substrate 360. In this case, when no voltage is applied through the lower electrode 340, the particles 320 and the first solvent 310 are narrowly distributed on the substrate 360 due to the wetting property of the first solvent 310 (i.e., its large contact angle with respect to the substrate 360), so that the transmittance of light incident on the substrate 360 may be increased.

Meanwhile, according to the third embodiment of the invention, the wetting properties of the first solvent 310 and the second solvent 330 with respect to the substrate may be similar when no electric field is applied (i.e., the difference between the contact angle of the first solvent 310 with respect to the substrate 360 and that of the second solvent 330 with respect to the substrate 360 is within a predetermined range when no electric field is applied), so that the relative movement of the first solvent 310 and the second solvent 330 may not occur when no external force acts thereon. In this case, even if a voltage is applied to move the particles 320 and the first solvent 310 and adjust light transmittance, and then the applied voltage is blocked, the relative movement of the first solvent 310 and the second solvent 330 may not occur. Therefore, the light transmittance that has been adjusted while the voltage is applied may remain the same even after the voltage is blocked.

Since the above-described device 300 for adjusting light transmission according to the third embodiment of the invention employs the particles having a better light blocking property as compared to a conventional electrowetting display, an optical density may be increased and light blocking performance may be enhanced. Further, since the movement resistance of the particles may be reduced as compared to a conventional electrophoretic display, the moving speed of the particles may be increased and further the switching of light transmittance may be accelerated.

Hereinafter, various modified embodiments, which may be applied to the above-described first to third embodiments of the invention, will be described in detail.

Figure 4:
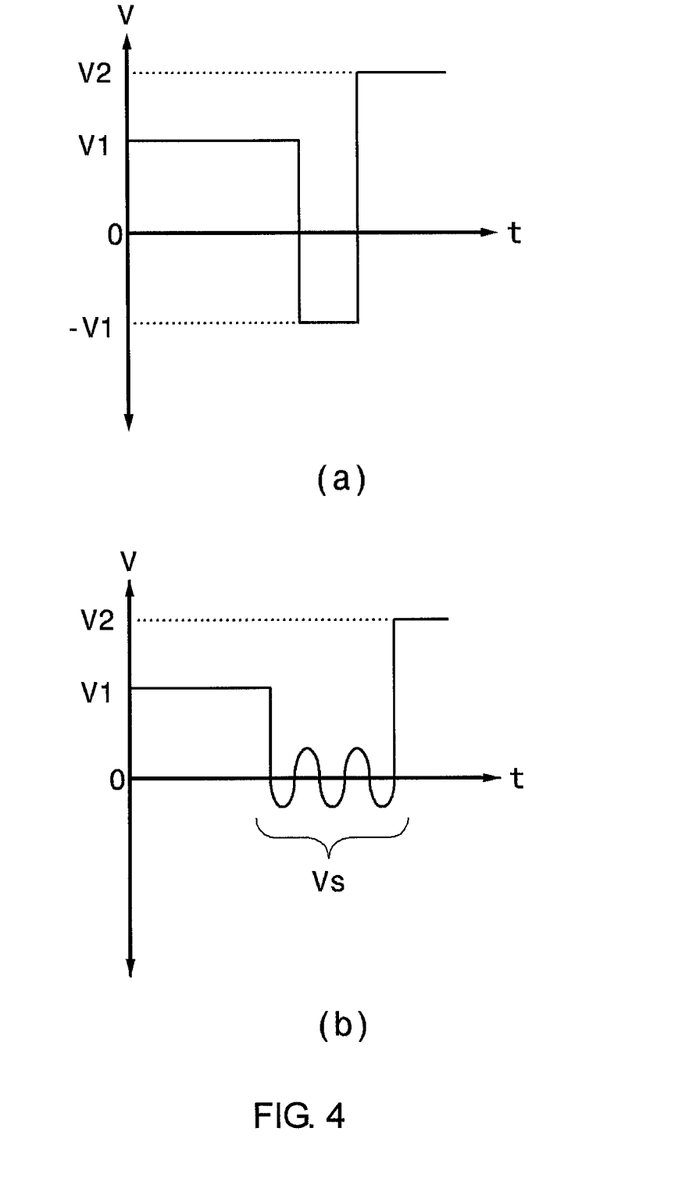
FIG. 4 shows the patterns of voltages applied to a device for adjusting light transmission according to one embodiment of the invention.

FIG. 4 illustratively shows the patterns of voltages (i.e., electric fields) applied to a device for adjusting light transmission according to one embodiment of the invention.

First, with reference to (a) of FIG. 4, when a device for adjusting light transmission according to one embodiment of the invention sequentially applies a first voltage V1 and a second voltage V2 to particles, a first solvent and a second solvent, a reset voltage −V1 in the opposite direction of the first voltage V1 may be applied to the particles, first solvent and second solvent after the first voltage V1 is applied and before the second voltage V2 is applied, so that the particles, first solvent and second solvent may return to their initial arrangement from the arrangement made under the control of the first voltage V1.

Next, with reference to (b) of FIG. 4, when the device for adjusting light transmission according to one embodiment of the invention sequentially applies the first voltage V1 and the second voltage V2 to the particles, first solvent and second solvent, an alternating-current voltage Vs may be applied to the particles, first solvent and second solvent after the first voltage V1 is applied and before the second voltage V2 is applied, so that the particles may be disorderedly disturbed and the dispersion state of the particles may be similar to their initial dispersion state. In this way, the particles, first solvent and second solvent may return to their initial arrangement from the arrangement made under the control of the first voltage V1.

Therefore, the device for adjusting light transmission according to one embodiment of the invention may enhance the performance of adjusting light transmittance, so that residual images may be suppressed, for example.

Meanwhile, according to one embodiment of the invention, the device for adjusting light transmission may comprise a state retention capacitor provided per each cell. Specifically, according to one embodiment of the invention, even though no driving voltage is applied to an electrode of the device for adjusting light transmission, the charges stored in the capacitor provided per each cell may be used to apply the same electric field as the previous one to the particles, first solvent and second solvent in each cell, so that the state of controlling light transmittance in each cell may be stably retained.

However, the configuration for applying voltages to the device for adjusting light transmission according to the invention is not necessarily limited to the above-described one, and may be appropriately modified as long as the objects of the invention may be achieved, e.g., so that light transmittance is adjusted by adjusting the intensity, direction, application time, number of times of application, and frequency (i.e., application period) of an applied voltage. Further, to this end, a device for displaying light transmittance according to the invention may be configured to be combined with thin film transistors (TFTs) to which various patterns of voltages may be applied.

Figure 5:
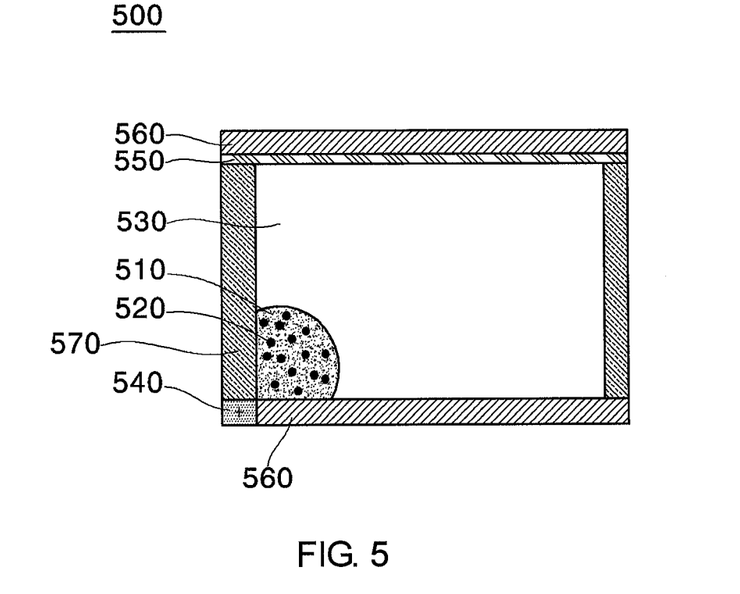
FIGS. 5 and 6 show the configuration of electrodes of a device for adjusting light transmission according to one embodiment of the invention.
Figure 6:
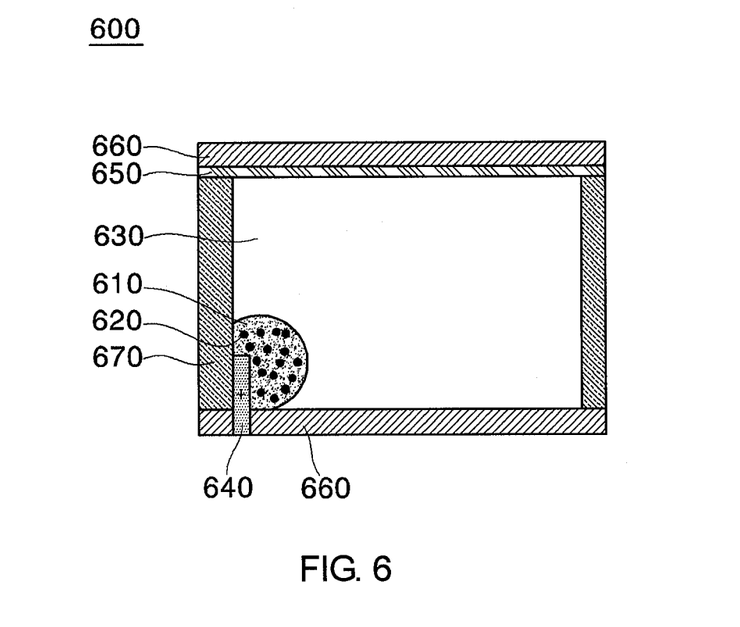

FIGS. 5 and 6 illustratively show the configuration of electrodes of a device for adjusting light transmission according to one embodiment of the invention.

First, with reference to FIG. 5, an electrode, particularly a lower electrode 540 of a device 500 for adjusting light transmission according to one embodiment of the invention may be formed under partitions 570 for dividing cells. Accordingly, when a voltage is applied to the lower electrode 540, an electrophoresis or electrowetting phenomenon may cause particles 520 and a first solvent 510 to be concentratively disposed at the lower parts of the partitions 570 where the lower electrode 540 is positioned.

Next, with reference to FIG. 6, an electrode, particularly a lower electrode 640 of a device 600 for adjusting light transmission according to one embodiment of the invention may be formed over partitions 670 for dividing cells. Accordingly, when a voltage is applied to the lower electrode 640, an electrophoresis or electrowetting phenomenon may cause particles 620 and a first solvent 610 to be concentratively disposed at the parts of the partitions 670 where the lower electrode 640 is positioned.

Therefore, the devices 500 and 600 for adjusting light transmission according to one embodiment of the invention shown in FIGS. 5 and 6 may concentrate the particles 520 and 620 and the first solvents 510 and 610 near the partitions, so that the particles 520 and 620 or the first solvents 510 and 610 may not interrupt the progress of light incident on the devices 500 and 600 for adjusting light transmission (i.e., opening ratios of the devices 500 and 600 for adjusting light transmission may be increased). Therefore, the maximum light transmittance of the devices 500 and 600 for adjusting light transmission may be increased.

Figure 7:
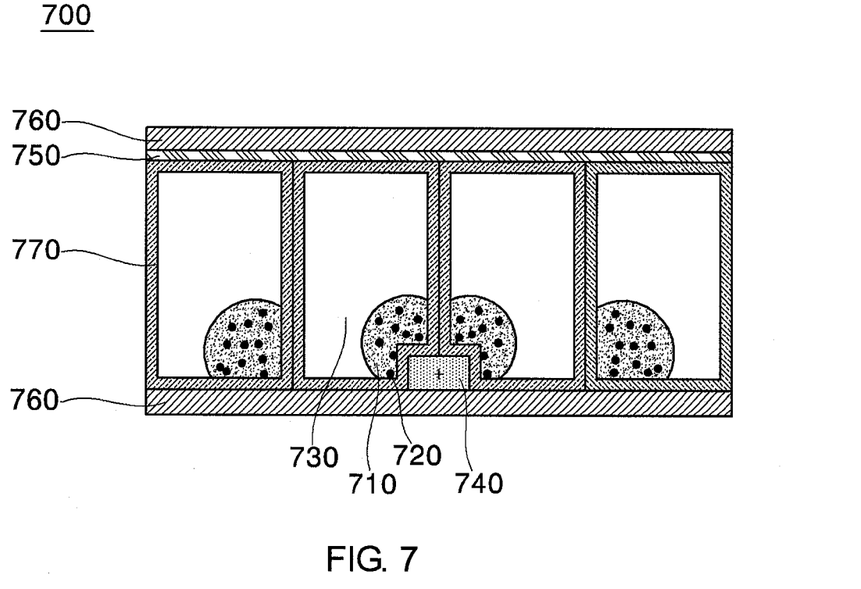
FIGS. 7 to 9 show the configuration of cells of a device for adjusting light transmission according to one embodiment of the invention.
Figure 8:
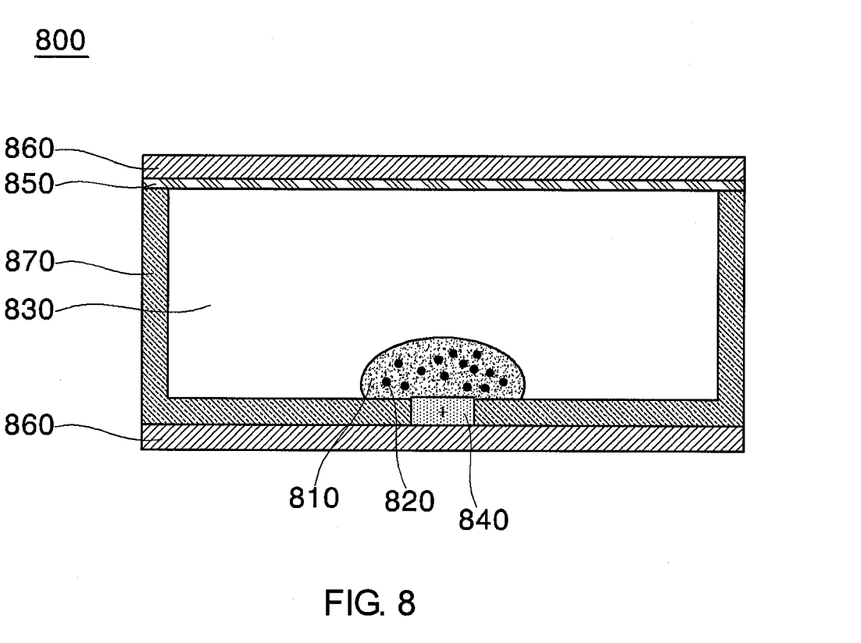
Figure 9:
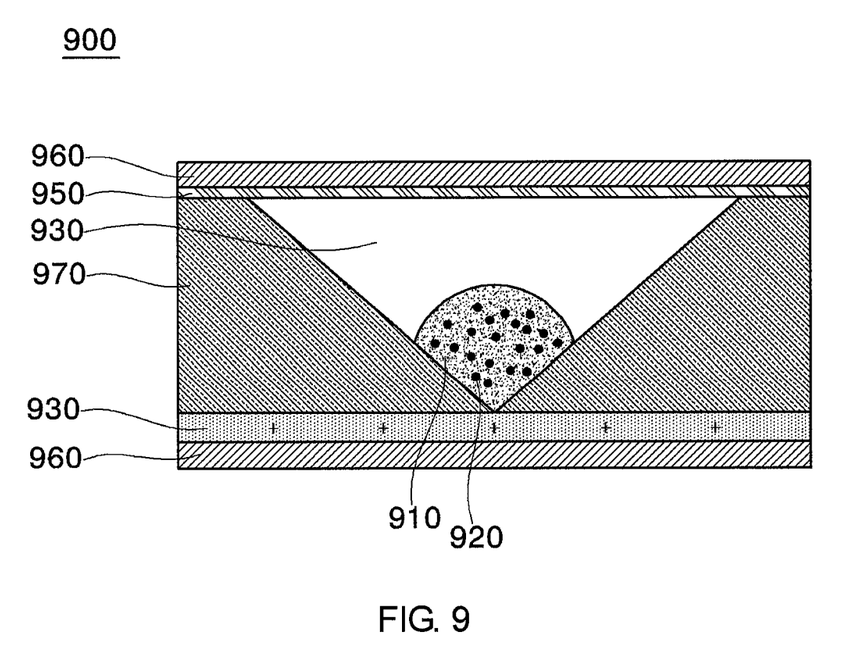

FIGS. 7 to 9 illustratively show the configuration of cells of a device for adjusting light transmission according to one embodiment of the invention.

First, with reference to FIG. 7, a device 700 for adjusting light transmission according to one embodiment of the invention comprises particles 720, a first solvent 710 and a second solvent 730, which may be encapsulated into a plurality of capsules 770 composed of a light transmitting material. According to one embodiment of the invention, encapsulating the particles 720, first solvent 710 and second solvent 730 may prevent direct interference such as intermingling of the particles 720, first solvent 710 and second solvent 730 included in different capsules; may prevent electrohydrodynamic (EHD) movement of charged particles from causing an uneven arrangement of the particles; and may facilitate the sealing of the particles 720, first solvent 710 and second solvent 730 so that the device for adjusting light transmission may be more readily processed into the form of a film.

Next, with reference to FIG. 8, a lower electrode 840 of a device 800 for adjusting light transmission according to one embodiment of the invention may be inserted in partitions 870 to be integrally formed with the partitions 870. According to one embodiment of the invention, a method for simultaneously forming the patterns of the lower electrode 840 and the partitions 870 using a process such as imprinting may be employed. For example, all of the lower electrode 840 and the partitions 870 may be formed in one process by coating a soft material on the lower electrode 840 and then performing imprinting or pressing using a mold made in the form of the partitions and the lower electrode. For another example, the lower electrode 840 and the partitions 870 may be formed at the same time using a dual irradiation lithography process. That is, the lower electrode 840 and the partitions 870 may be formed at the same time by coating a first photoresist reacting to a first wavelength and a second photoresist reacting to a second wavelength, irradiating a lower electrode pattern onto the first photoresist and a partition pattern onto the second photoresist, and then etching the first and second photoresists at the same time.

Next, with reference to FIG. 9, partitions 970 of a device 900 for adjusting light transmission according to one embodiment of the invention may be formed in the form of a slope having a predetermined angle, and may be composed of a light transmitting material. According to one embodiment of the present invention, even though a voltage is applied through the whole of a lower electrode 930, which is formed on the entire lower part of a substrate 960 without separately patterning the lower electrode 930, particles 920 and a first solvent 910 may naturally be disposed concentratively at the lower part of a trench formed by the slope of the partitions.

However, the configurations of the electrodes, partitions, capsules and the like of the device for adjusting light transmission according to the invention are not necessarily limited to the above-described ones, and may be appropriately modified as long as the objects of the invention may be achieved.

Figure 10:
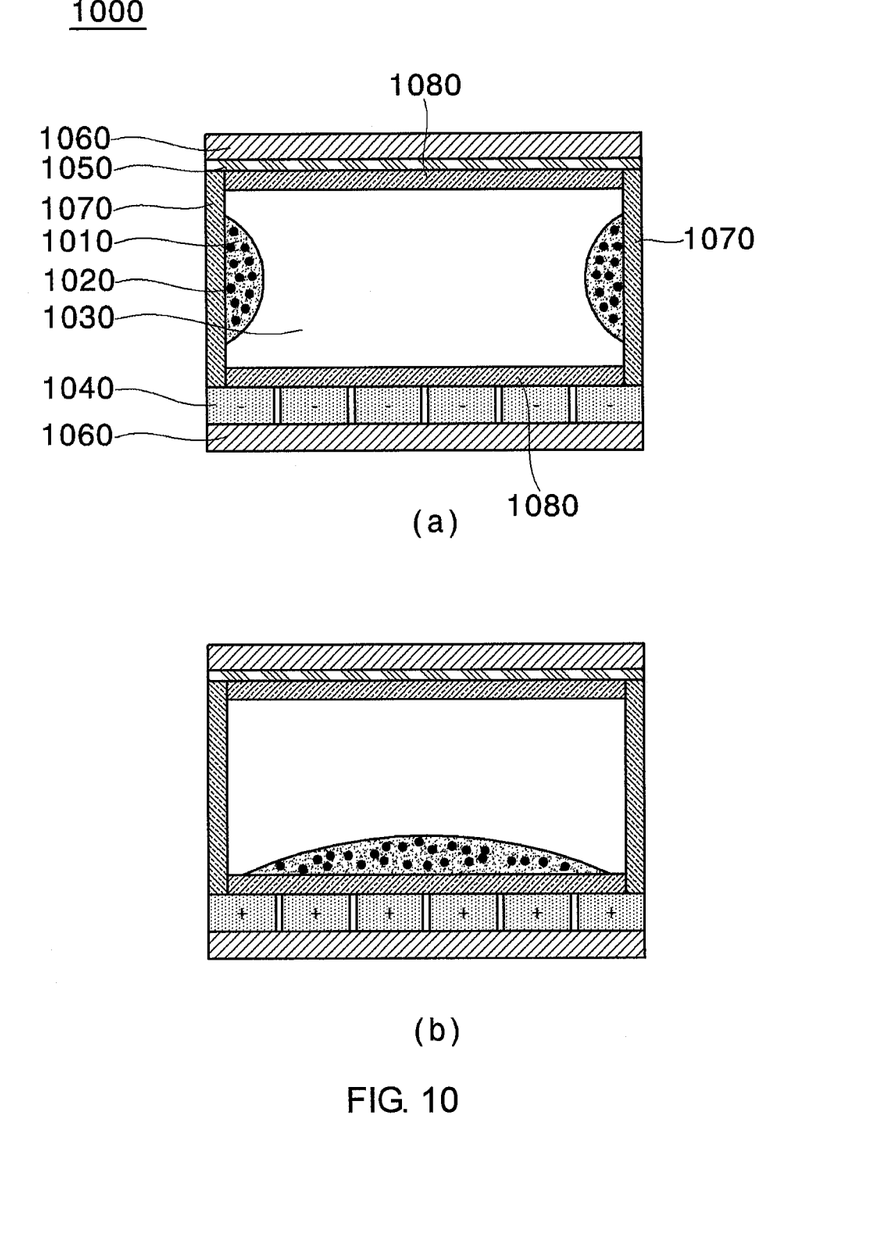
FIG. 10 shows the configuration of partitions included in cells of a device for adjusting light transmission according to one embodiment of the invention.

FIG. 10 illustratively shows the configuration of partitions included in cells of a device for adjusting light transmission according to one embodiment of the invention.

With reference to FIG. 10, partitions of a device 1000 for adjusting light transmission according to one embodiment of the invention may comprise side partitions 1070 and upper and lower partitions 1080. Specifically, the side partitions 1070 and the upper and lower partitions 1080 may be composed of a hydrophilic material and a hydrophobic material, respectively, or composed of a hydrophobic material and a hydrophilic material, respectively. Accordingly, in an inactive state in which no voltage is applied, particles 1020 and a first solvent 1010, which are hydrophilic or hydrophobic, may be contacted only with the hydrophobic or hydrophilic side partitions 1070, respectively, so that a light transmission mode in which light transmittance is high may be implemented.

With reference to FIG. 10, the following may be assumed: the negatively charged particles 1020 are hydrophilic; the first solvent 1010 is hydrophilic; a second solvent 1030 is hydrophobic; the side partitions 1070 are hydrophilic; and the upper and lower partitions 1080 are hydrophobic.

With reference to (a) of FIG. 10, in an inactive state in which no voltage is applied through a lower electrode 1040, the hydrophilic particles 1020 and first solvent 1010 may move toward the hydrophilic side partitions 1070 to be contacted with the side partitions 1070. In this case, the area of a light incident surface (i.e., a substrate 1060) occupied by the light blocking particles 320 may be reduced to increase the transmittance of light incident on the substrate 1060, so that the light transmission mode may be implemented. Specifically, according to one embodiment of the present invention, since the particles 1020 and the first solvent 1010 are in contact with the side partitions 1070 so that the particles 1020 may less interrupt the progress of the incident light, the opening ratio in the light transmission mode may be increased. On the contrary, with reference to (b) of FIG. 10, when a positive (+) voltage is applied through the whole of the lower electrode 1040, the particles 1020 having an electrophoretic property may move together with the first solvent 1010 so that they may be evenly distributed with respect to all partial electrodes to which the positive voltage is applied, while a contact angle of the first solvent 1010 having a wetting property with respect to the substrate 1060 may be reduced. In this case, the first solvent 1010 may be contacted with a large region of the substrate 1060 (i.e., the lower partitions 1080), so that the area where the light blocking particles 1020 are distributed may be increased to reduce the transmittance of light incident on the substrate 1060.

In the foregoing, an embodiment has been described in which only the lower electrode among the upper and lower electrodes included in the device for adjusting light transmission is patterned. However, the configuration of the electrodes of the device for adjusting light transmission according to the invention is not necessarily limited thereto. It should be noted that various modified embodiments may be applied without limitation, for example, in which all of the upper and lower electrodes are patterned so that light transmittance may be adjusted in all of the upper and lower electrodes, or in which only one of the upper and lower electrodes is formed and a comb pattern (i.e., a set of patterns in which conductors aligned at equal intervals are disposed in a combination manner) is formed in the corresponding electrode.

Meanwhile, the particles included in the device for adjusting light transmission according to one embodiment of the invention may be composed of a material that blocks at least one of visible light, ultraviolet light and infrared light, and the wavelength bandwidth of the light blocked by the particles may change the wavelength bandwidth of the light whose transmittance is adjustable by the device for adjusting light transmission. According to one embodiment of the invention, the transmittance of at least one of visible light, ultraviolet light and infrared light may be adjusted by vertically stacking cells each including first, second and third particles respectively blocking visible, ultraviolet and infrared lights, and driving the cells independently.

Meanwhile, the device for adjusting light transmission according to the invention may be combined with a different type of display device and configured to implement various display modes. Specifically, the device for adjusting light transmission according to the invention may be configured to be combined with a display device using an electrorheological fluid, an emissive display device, a reflective display device, a color-filter type display device, and the like.

Meanwhile, when manufacturing the device for adjusting light transmission according to the invention, the first and second solvents may be injected between the substrates (i.e., into the cells) at the same time in the state of an emulsion in which the solvents are mixed with each other, and the emulsion injected between the substrates may be separated into the first and second solvents over time.

Further, when manufacturing the device for adjusting light transmission according to the invention, the first and second solvents may be injected to each of the cells divided by the partitions, respectively. Specifically, the first solvent including the particles may be first injected into a cell so that the first solvent may be formed in the form of a droplet in some regions of the cell surface, and then the second solvent not including the particles may be injected to the entire regions within the cell. According to the above manufacturing process, the particles may not exist in the sealing part of the substrate and the partitions, so that the substrate and the partitions may be normally sealed without being disturbed by the particles.

Meanwhile, in the foregoing, an embodiment has been described in which the device for adjusting light transmission according to the invention comprises both of the first and second solvents that do not mix with each other. However, the configuration of the device for adjusting light transmission according to the invention is not necessarily limited thereto. That is, in the above-described first to third embodiments, the devices 100, 200 and 300 for adjusting light transmission according to the invention may be configured such that only the first solvents 110, 210 and 310 in which the particles 120, 220 and 320 are dispersed (i.e., which are mixed with the particles) are included, while the spaces in which the second solvents 130, 230 and 330 have existed are left empty. Here, a process may be employed in which the second solvents 130, 230 and 330 with low evaporation points are mixed with the first solvents 110, 210 and 310 and injected into a cell, and then the second solvents 130, 230 and 330 are evaporated over time so that only the first solvents 110, 210 and 310 remain in the cell. In this manner, even though the devices 100, 200 and 300 for adjusting light transmission according to the invention do not comprise the second solvent, the function of adjusting light transmission may be normally performed according to the operation principles described above in connection with the first to third embodiments. In this regard, the foregoing description of FIGS. 1 to 3 will be substituted for a detailed description on the case where the devices 100, 200 and 300 for adjusting light transmission according to the invention do not comprise the second solvents 130, 230 and 330.

Although the present invention has been described above in terms of specific items such as detailed components as well as the limited embodiments and the drawings, they are only provided to help general understanding of the invention, and the present invention is not limited to the above embodiments. It will be appreciated by those skilled in the art to which the present invention pertains that various changes and modifications may be made from the above description.

Accordingly, the spirit of the present invention should not be limited to the above-described embodiments, and the entire scope of the appended claims and their equivalents will fall within the spirit and scope of the invention.

What is claimed is:

1. A device for adjusting light transmission, comprising: charged particles composed of a light blocking material; a first solvent in which the particles are dispersed; and a second solvent not being mixed with the first solvent, wherein the particles are mixed with the first solvent but are not mixed with the second solvent, and wherein light transmittance is adjusted by adjusting an electric field applied to the particles to move the particles and moving the first solvent together with the particles using a difference in movement resistance at an interface between the particles and the first solvent and that at an interface between the first solvent and the second solvent to control a blocking area of the first solvent with respect to a light incident surface.

2. A device for adjusting light transmission according to claim 1, wherein the first solvent and the second solvent is composed of a light transmitting material.

3. A device for adjusting light transmission according to claim 1, wherein the particles and the first solvent are hydrophilic and the second solvent is hydrophobic, or the particles and the first solvent are hydrophobic and the second solvent is hydrophilic.

4. A device for adjusting light transmission according to claim 1, wherein the particles and the first solvent are polar and the second solvent is non-polar, or the particles and the first solvent are non-polar and the second solvent is polar.

5. A device for adjusting light transmission according to claim 1, wherein the movement resistance at the interface between the particles and the first solvent is larger than that at the interface between the first solvent and the second solvent.

6. A device for adjusting light transmission according to claim 1, wherein the particles, the first solvent and the second solvent are encapsulated by capsules composed of a light transmitting material.

7. A device for adjusting light transmission according to claim 1, wherein the particles, the first solvent and the second solvent are partitioned by cells composed of an insulating material.

8. A device for adjusting light transmission according to claim 1, wherein after the electric field is applied to the particles, the first solvent and the second solvent, an electric field in the opposite direction of the electric field or an alternating-current electric field is applied to reset an arrangement of the particles, the first solvent and the second solvent.

9. A device for adjusting light transmission according to claim 1, wherein the light transmittance is adjusted by adjusting at least one of an intensity, direction, application time, number of times of application, and application period of the electric field.

10. A device for adjusting light transmission, comprising: charged particles composed of a light blocking material; a first solvent having an electrowetting property in which the particles are dispersed; and a second solvent not being mixed with the first solvent, wherein the particles are mixed with the first solvent but are not mixed with the second solvent, and wherein light transmittance is adjusted by adjusting an electric field applied to the first solvent to control a blocking area of the first solvent with respect to a light incident surface, and by adjusting an electric field applied to the particles to move the particles and moving the first solvent together with the particles using a difference in movement resistance at an interface between the particles and the first solvent and that at an interface between the first solvent and the second solvent to control a blocking area of the first solvent with respect to the light incident surface.

11. A device for adjusting light transmission according to claim 10, wherein the first solvent and the second solvent is composed of a light transmitting material.

12. A device for adjusting light transmission according to claim 10, wherein the particles and the first solvent are hydrophilic and the second solvent is hydrophobic, or the particles and the first solvent are hydrophobic and the second solvent is hydrophilic.

13. A device for adjusting light transmission according to claim 10, wherein the particles and the first solvent are polar and the second solvent is non-polar, or the particles and the first solvent are non-polar and the second solvent is polar.

14. A device for adjusting light transmission according to claim 10, wherein the movement resistance at the interface between the particles and the first solvent is larger than that at the interface between the first solvent and the second solvent.

15. A device for adjusting light transmission according to claim 10, wherein the particles, the first solvent and the second solvent are encapsulated by capsules composed of a light transmitting material.

16. A device for adjusting light transmission according to claim 10, wherein the particles, the first solvent and the second solvent are partitioned by cells composed of an insulating material.

17. A device for adjusting light transmission according to claim 10, wherein after the electric field is applied to the particles, the first solvent and the second solvent, an electric field in the opposite direction of the electric field or an alternating-current electric field is applied to reset an arrangement of the particles, the first solvent and the second solvent.

18. A device for adjusting light transmission according to claim 10, wherein the light transmittance is adjusted by adjusting at least one of an intensity, direction, application time, number of times of application, and application period of the electric field.

19. A device for adjusting light transmission, comprising: charged particles composed of a light blocking material; and a first solvent in which the particles are dispersed, wherein light transmittance is adjusted by adjusting an electric field applied to the particles to move the particles and moving the first solvent together with the particles using movement resistance at an interface between the particles and the first solvent to control a blocking area of the first solvent with respect to a light incident surface.

20. A device for adjusting light transmission, comprising: charged particles composed of a light blocking material; and a first solvent having an electrowetting property in which the particles are dispersed, wherein light transmittance is adjusted by adjusting an electric field applied to the first solvent to control a blocking area of the first solvent with respect to a light incident surface, and by adjusting an electric field applied to the particles to move the particles and moving the first solvent together with the particles using movement resistance at an interface between the particles and the first solvent to control a blocking area of the first solvent with respect to the light incident surface.

\* \* \* \* \*